3,563,818
IGNITION AID FOR SOLID PROPELLANTS

Clarence L. Miller, Sunnyvale, and Ralph Anderson, Saratoga, Calif., assignors, by mesne assignments, to the United States of America as represented by the Secretary of the Navy
No Drawing. Filed Apr. 17, 1967, Ser. No. 634,030
Int. Cl. C06b 19/02
U.S. Cl. 149—3      4 Claims

ABSTRACT OF THE DISCLOSURE

The invention comprises a process of coating a solid propellant surface with tetramethylammonium hydrotriborate to enhance ignition with liquid hypergolic oxidizer. An example is a solid composite propellant comprising a mixture of polybutadiene and an inorganic oxidizer coated with p,p'-isopropylidenediphenol, epichlorohydrin and butyl gylcidyl ether and tetramethylammonium hydrotriborate.

---

This invention relates to a process for making the surface of a propellant grain responsive to hypergolic ignition; more particularly, it involves applying tetramethylammonium hydrotriborate to the propellant surface where it acts as an ignition aid.

It has been observed that in the use of liquid hypergolic oxidizers to ignite solid propellants there are at least two problem areas: (1) ignition of solid propellants with reduced reactivity towards the type of hypergolic oxidizer being used, and (2) ignition of solid propellants under temperatures and pressures not conducive to ignition by hypergolic oxidizers. Both problems have been eliminated by the present invention which makes the propellant surface more responsive to the hypergolic ignition stimulus by applying to the surface of a solid propellant a compound which forms a spontaneously ignitible coating.

It is therefore an object of the present invention to provide a technique for treating the surface of solid propellant grains which greatly reduces ignition delay.

Another object is to provide an aid which will enable quick ignition of solid grains under adverse environmental conditions.

Other objects, features, and many of the attendant advantages of this invention will become readily appreciated as the same become better understood by reference to the following detailed description.

In accordance with the present invention the surface of a solid composite propellant grain was coated, by dusting, spraying or other means, with the compound, tetramethylammonium hydrotriborate. When liquid hypergolic oxidizers came in contact with the surface of the grain so coated, ignition occurred at greatly reduced time delays.

Tetramethylammonium hydrotriborate known as QMB-3 is a crystalline powder. It is hygroscopic and a thermal vacuum stability test indicated that the salt begins to decompose at approximately 145° C. The rate of decomposition increases rapidly at the temperature approaches 175° C. The pure compound was found to be very reactive with the liquid hypergolic oxidizers, chlorine trifluoride and red fuming nitric acid (RFNA).

A series of tests were conducted to determine the ability of tetramethylammonium hydrotriborate as a propellant surface coating agent to initiate propellant ignition under environmental conditions in which the propellant itself cannot be ignited hypergolically. Composite propellant samples, consisting essentially of a polybutadiene binder and an inorganic oxidizer, were coated with a layer of the compound, QMB-3. In most instances the propellant surface was first prepared by spraying with an epoxy resin so that it would hold the powder as it was dusted on. The results of these tests included:

(A) In the first series, control samples of the propellant maintained at a temperature of 60° C. and atmospheric pressure of 1 and 2 p.s.i.a. could not be ignited with a spray of chlorine trifluoride (ClF)$_3$. However, a similar propelant with the surface coated with tetramethylammonium hydrotriborate exposed to the same test conditions and volume of hypergolic oxidizers did ignite at short ignition delays.

(B) In another series, control samples of composite propellant maintained at a temperature of 40° C. and pressures of 1 and 2 p.s.i.a. could not be ignited with a spray of either chlorine trifluoride (ClF$_3$) or red fuming nitric acid (RFNA). However, similar samples with the surfaces coated with the powdered tetramethylammonium hydrotriborate did ignite.

(C) Similar results were obtained when the environmental conditions were changed to 20° C. and 1 p.s.i.a.

The surface of the propellant may be dusted with the powdered salt or may be sprayed or painted on if the QMB-3 is mixed with an epoxy. Epon 815 and tetramethylammonium hydrotriborate may be admixed and painted or brushed onto the propellant surface. Epon 815 consists essentially of bisphenol A, epichlorohydrin and butyl glycidyl ether. Bisphenol A is the brand name, for para,para' - isopropylidenediphenol (see Condensed Chemical Dictionary, 3rd edition, 1956). A thin coating of QMB-3 and epoxy produces a surface which becomes hypergolic and ignites with liquid oxidizers that will not normally ignite the propellant.

Other adhesives which are compatible to both QMB-3 and the propellant surface may be used to prepare the surface prior to dusting on the powdered compound.

Obviously many modifications and variations of the present invention are possible in light of the above teachings. It is therefore to be understood that within the scope of the appended claims the invention may be practiced otherwise than as specifically described.

What is claimed is:

1. A method for improving the hypergolic ignition of the surface of a composite propellant grain at temperatures ranging from 20° to 160° C.;
    said grain consisting essentially of about equal parts polybutadiene binder and inorganic oxidizer which comprises applying tetramethylammonium hydrotriborate to said surface.

2. The method of claim 1 wherein said tetramethylammonium hydrotriborate in powdered form is dusted on said surface.

3. The method of claim 1 wherein said tetramethylammonium hydrotriborate mixed with epoxy resin is spread in a thin layer on said surface.

4. A solid composite propellant consisting essentially of an intimate mixture of polybutadiene binder and an inorganic oxidizer, coated with a thin layer of an admixture of para,para' - isopropylidenediphenol, epichlorohydrin and butyl glycidyl ether and tetramethylammonium hydrotriborate.

References Cited

UNITED STATES PATENTS

| | | | |
|---|---|---|---|
| 3,313,603 | 4/1967 | Hough et al. | 149—22X |
| 3,032,449 | 5/1962 | Fox et al. | 149—4 |
| 3,177,652 | 4/1965 | Lewis | 149—22X |

LELAND A. SEBASTIAN, Primary Examiner

U.S. Cl. X.R.

149—1, 4, 22, 74